United States Patent [19]

Dekel

[11] Patent Number: 5,456,103
[45] Date of Patent: Oct. 10, 1995

[54] MEASUREMENT OF FIBER DRIFT

[75] Inventor: Ehud Dekel, Nofit, Israel

[73] Assignee: State of Israel, Ministry of Defense, Armament Development Authority, Haifa, Israel

[21] Appl. No.: 83,013

[22] Filed: Jun. 24, 1993

[30] Foreign Application Priority Data

Jul. 20, 1992 [IL] Israel ......................................... 102558

[51] Int. Cl.$^6$ ................................................... G01N 19/02
[52] U.S. Cl. ................................................. 73/9; 73/147
[58] Field of Search .................................. 73/9, 147, 160, 73/785, 794, 795, 826, 828, 829, 837, 841, 846, 849, 852, 865.6

[56] References Cited

U.S. PATENT DOCUMENTS

| | | | |
|---|---|---|---|
| 3,977,244 | 8/1976 | Stone | 73/147 |
| 4,825,702 | 5/1989 | Cizek | 73/834 |
| 4,911,027 | 3/1990 | White | 73/865.6 |
| 5,207,106 | 5/1993 | Schwider et al. | 73/828 |

FOREIGN PATENT DOCUMENTS

| | | | |
|---|---|---|---|
| 4018558 | 12/1991 | Germany | 73/147 |
| 286302 | 11/1970 | U.S.S.R. | 73/147 |

*Primary Examiner*—Robert Raevis
*Attorney, Agent, or Firm*—Reising, Ethington, Barnard and Perry

[57] ABSTRACT

A method for measuring drag forces acting on optical fibers and thin metal wires as a result of the influence of wind of varying force. Also a system for effecting such measurements, based on means for exposing a tightened fiber or wire to an essentially constant flow of air, while at an angle to such flow, means being provided for measuring forces acting on such fiber or wire.

6 Claims, 4 Drawing Sheets

MEASUREMENT OF FIBER DRIFT

FIELD OF THE INVENTION

The invention relates to a method for measuring the drag on thin filaments when exposed to wind forces. In the following the term filament means an optical fiber, a thin metal wire or the like and wind tunnel means its accepted known definition of an experimental system, used to measure aerodynamical parameters of bodies while the bodies are exposed in the wind tunnel to different controlled conditions of air flow. The invention further relates to a device for carrying out such measurements. The measurements of dynamic drag on thin filaments is of importance in various fields, and especially when a long length of such a filament is deployed in the air, like in the case of an unmanned aircraft, connected to its launcher by a fiber optic communication link which includes an optical fiber dispenser mounted usually at the aft part of the aircraft, that pays out the fiber as the aircraft advances. Such an aircraft may have a range of tens of kilometers and flight time of several minutes. In such a case its important to know:

a) The length of fiber in the aircraft fiber dispenser needed for accomplishing the mission under extreme wind conditions.

b) The fiber rate of fall (will it reach the ground?).

c) The tension in the fiber (will it survive the tensile stress?). It is especially important to know the tensile loads acting on the fiber, because optical fibers are proof tested at relatively low tensile loads (in the range of 1.5 to 4 kg) and moreover, when subjected to sustained loadings (like the case of such an aircraft flight), their strength might degrade by stress corrosion.

BACKGROUND OF THE INVENTION

Aerodynamic drag force acting on cylinders (including infinitely long ones) is usually separated to an axial component acting along the cylinder axis and a normal component acting in the radial direction. Generally speaking the radial component affects fiber drift rate caused by wind, and fiber fall rate caused by fiber weight, while the axial component affects tension build up along the fiber. A large amount of data exist concerning the normal component and the values given by different sources usually match. This is not the case concerning the axial component, where there are only few sources, most of which are based on measurements made on cables towed in water, and differ much from each other, and thus these cannot be used for practical purposes.

It is one of the difficulties in carrying out accurate measurements of axial drag acting on inclined elongated bodies that, in most cases, the radial drag component is higher by an order of magnitude than the axial one and tends to cause parasitic loads on measuring equipment, which result in erratic axial drag reading.

Also, formulae derived from measurements made on cables and strings and not the filament of interest, do not take into account the nature of the specific filament surface, especially when it has been deployed from an air borne dispenser and contains remainders of the adhesive applied to it during the winding process.

There is provided a method for measuring the aerodynamic drag component parallel to the axis of filament and means for carrying out such measurements.

For carrying out the measurement, there is used a conventional sub-sonic wind tunnel, in conjunction with auxiliary devices, such as specially constructed pulleys, which are positioned either in the wind tunnel or on its outside. The filament is suspended while being supported by said pulleys, the direction of the wind being at a certain angle respective the axis of the filament.

According to one embodiment of the invention, the filament is suspended and tensioned between two such pulleys, and passes through openings in the walls of the wind tunnel, so that the filament makes an angle with the axis of tunnel.

The pulleys used are of special construction, so as to minimize frictional forces. Furthermore, the construction is such that when positioned in the wind tunnel, such pulley unit causes a minimum disturbance on the flow of air in the tunnel.

As set out above, there can be used the following arrangements:

a) The two pulley units are positioned outside the tunnel, and the fiber is tensioned between them through two holes in the wind tunnel; making an angle with the tunnel axis;

b) One pulley unit is positioned outside the wind tunnel, the other inside, with the fiber passing between them. This makes it possible to measure dynamic drag at small angles between the fiber axis and the tunnel axis.

c) Both pulley units are inside the tunnel, the position can be such that the fiber makes even a smaller angle with the tunnel axis.

In this case the up-stream pulley unit may cause some disturbances of wind flow in the tunnel section used for the measurement. The filament, such as an optical fiber, is tensioned by means of two weights, underneath each pulley. The weight at one end being slightly heavier than the other causing it to rest on a precise scale. In this position the scale is zeroed. At this stage the wind tunnel fan is turned on to cause an air stream of known velocity along the tunnel test chamber. When desired air velocity is reached the scale reading is registered and the filament horizontal deflection is registered using a TV camera, calibrated before against a mm scale. Then drag components can be estimated using the following expressions:

$$D = W/L$$

where:

D is the axial drag component in grams per meter.

W is the scale reading in grams

L is the filament length exposed to air steam $$Dn = T/R$$

where:

Dn is the radial drag component

T which is actually the tension in the filament is the average weight of the two weights.

R is the deflected filament radius of curvature, which can be calculated using several methods, one of which is:

$$R = \frac{L^2}{8d} + \frac{d}{2}$$

where d is the filament deflection at the center of its section exposed to the airstream, assuming a relatively short distance between the pulley and the exposed section.

The invention is described in greater detail, by way of example only, with reference to the enclosed Figures,, which are schematical and not according to scale, and in which.

Figure 1:
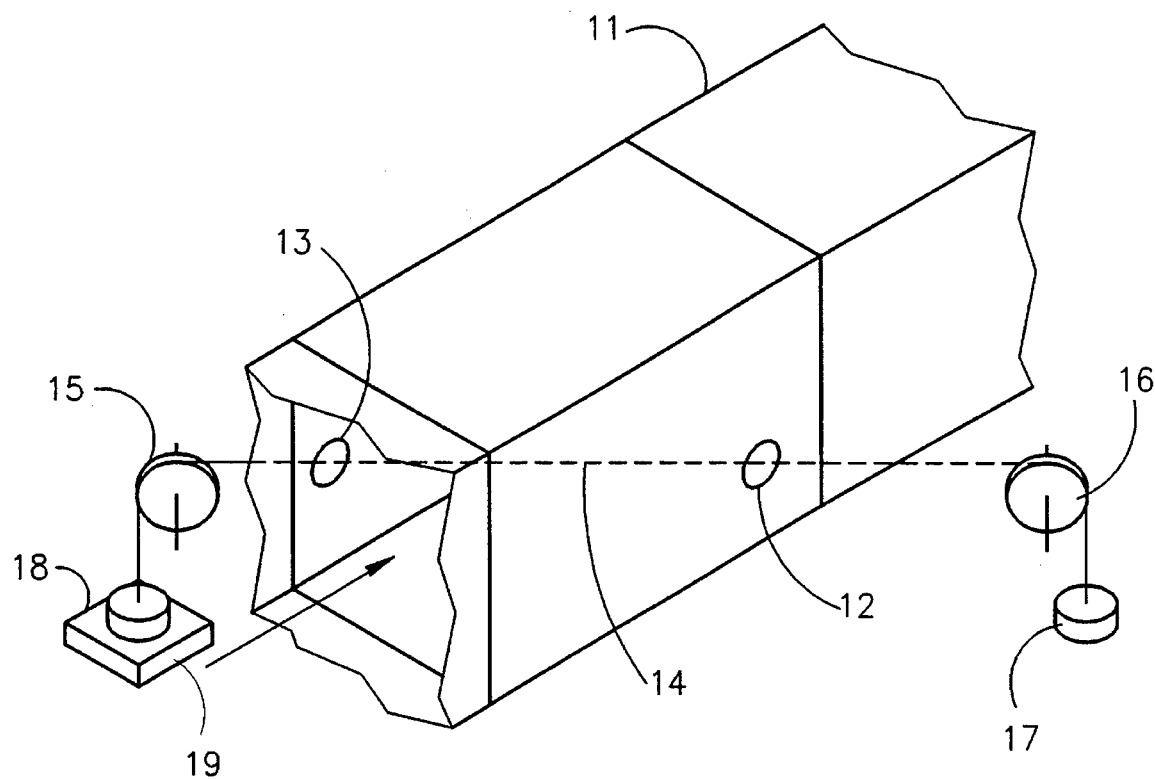
FIG. 1 is exonometric view of a wind tunnel with installed means for stretching a wire or fiber at an angle repective the tunnel axis, and for tensioning it.

As shown in FIG. 1, in wind tunnel 11, there are provided holes 12 and 13 in the side-walls of the tunnel, the direction of the wind being indicated by the arrow. A fiber, 14, is suspended between pulleys 15 and 16, with weights 17 and 18 suspended at the pulleys, where 19 indicates a balance.

Figure 2A:
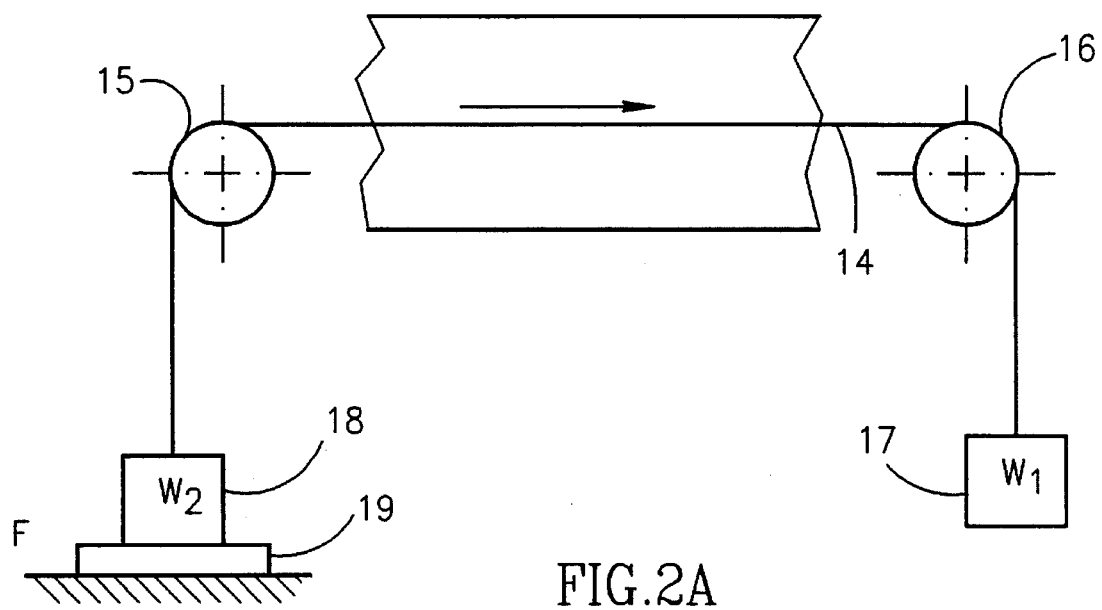
FIG. 2 is a top view of the tunnel, indicating the direction of the suspended fiber at rest and when exposed to a wind force.
Figure 2:
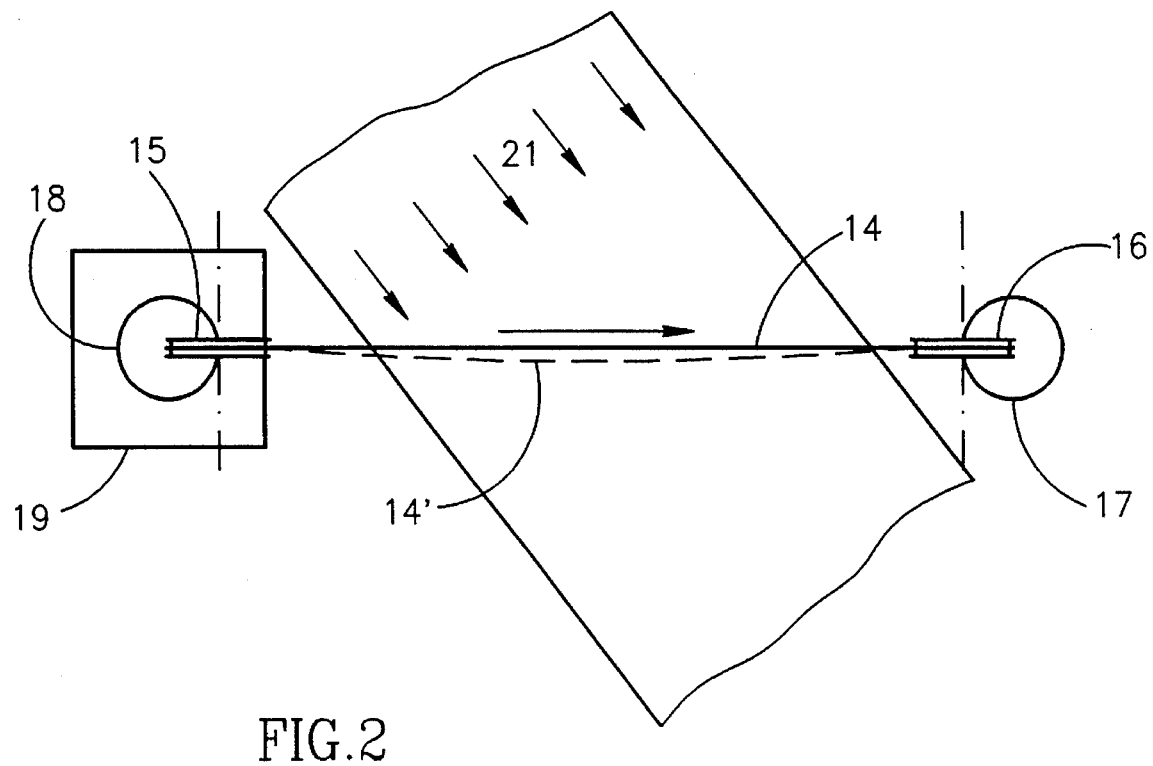

As shown in FIG. 2, the fiber 14 is tensioned between pulleys 15 and 16 by weights 17 and 18, where 18 is the heavier one, which rests on a balance (scale) 19.

As shown in FIG. 2a, an air-stream 21 acts on fiber 14 which is tensioned between pulleys 15 and 16, with weights 17 and 18, respectively, attached at both ends of the fiber.

FIG. 2 is a top view illustrating the fiber tensioning means.

Figure 3:
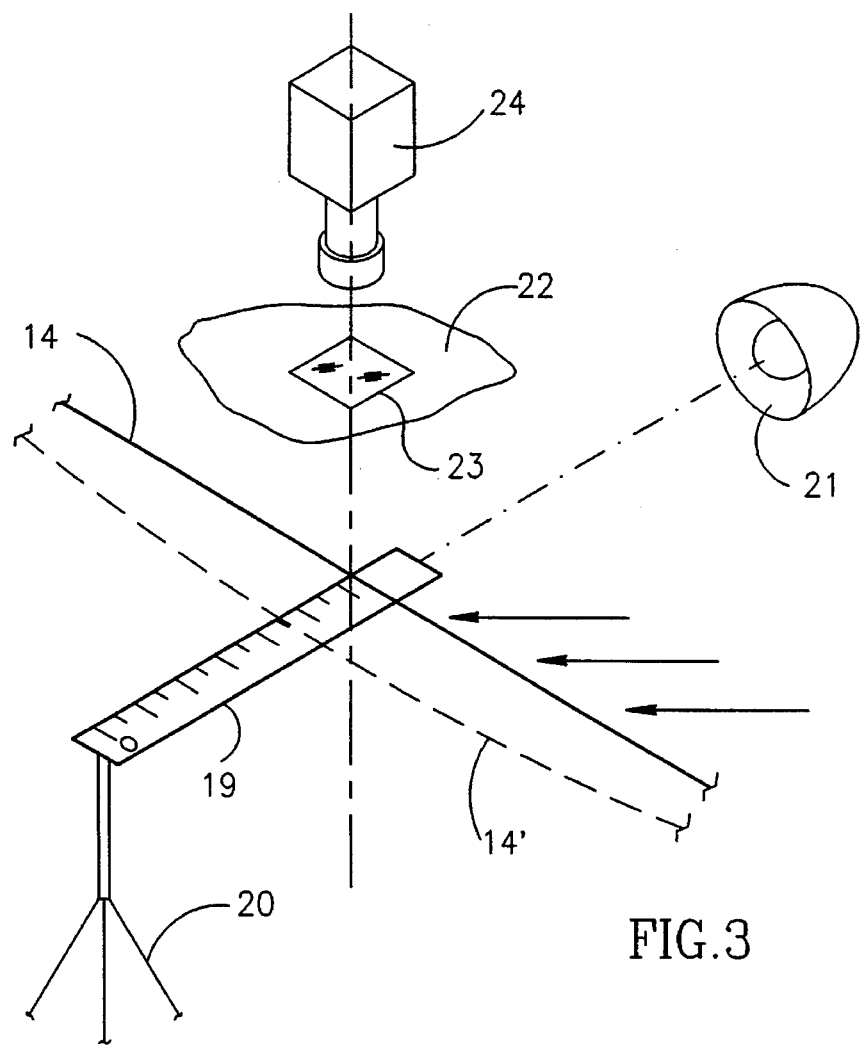
FIG. 3 illustrates the auxiliary equipment for measuring the deflection of the fiber/filament when exposed to a wind force.
Figure 4:
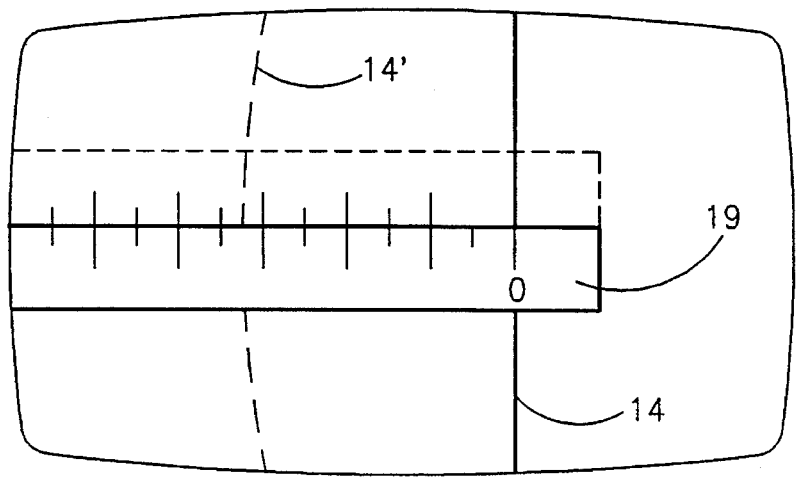
FIG. 4 shows the image of the deflected filament on a TV monitor connected to a TV camera directed to the tunnel inside though a window in the tunnel ceiling.

FIG. 2a is a side view of the arrangement of FIG. 2;

In FIG. 3, 14 is the suspended fiber/filament. Perpendicular to the wire or fiber 14 there is arranged a scale 19, supported by tripod 20. The fiber is illuminated by projector 21, and there is provided in the upper (roof) section 22, a window 23, above which there is arranged the TV camera 24. The scale zero coincides with the rest position of fiber 14. The scale marks are copied to the monitor screen using a marker, and this is the basis for the subsequent measurements, during which the scale and tripod are removed. In FIG. 4, 14 indicates the fiber/filament at rest and 14' is its position when the wind tunnel is active, as viewed on the TV monitor. 19 is the scale marks, as copied to the monitor before removing the scale from the wind tunnel.

Figure 5:
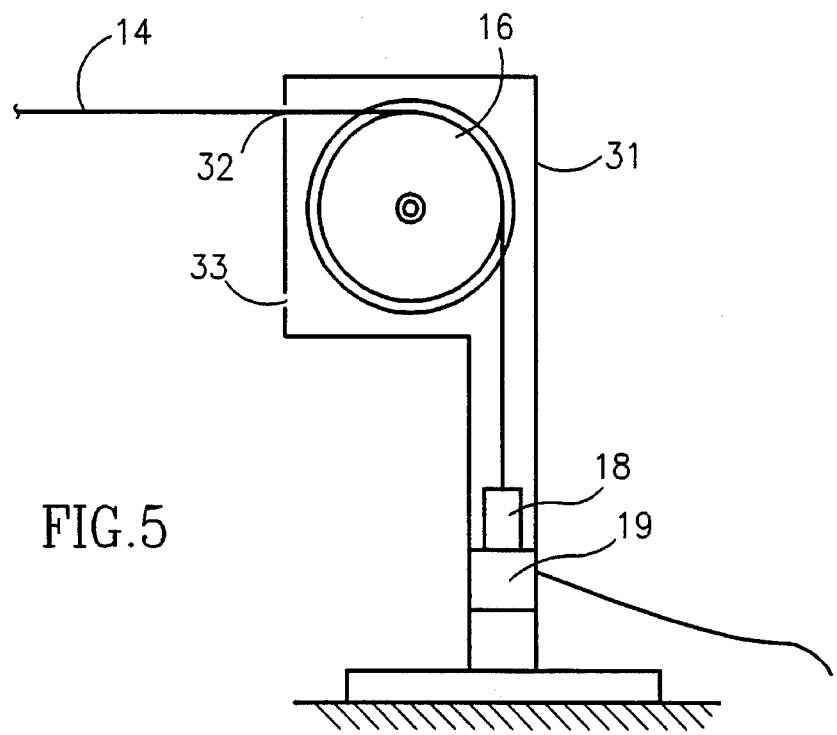
FIG. 5 is a sectional side view of a pulley assembly used for tensioning a wire or fiber during measurement.
Figure 6:
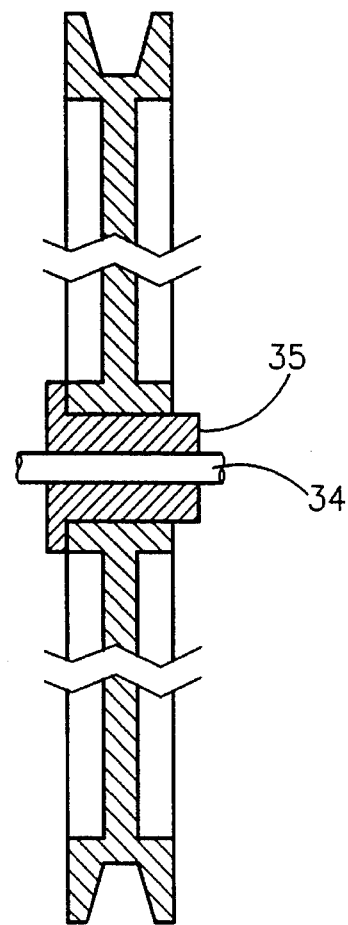
FIG. 6 is a sectional front view of such a pulley.

The pulley assembly shown in FIG. 5 and 6, comprises a fairing 31 provided with two openings 32 and 33, opening 32 is at the upper level of pulley 16, over which there extends fiber 14, at the end of which there is attached the weight 18. The second hole is for purposes of symmetry. The weight 18 rests on a balance or force transducer 19. The pulleys, 16, are designed for minimum friction, and their details are set out in FIG. 6. They comprise a thin disk, of about 2 mm thickness, and of a radius of the order of about 150 mm, with a 0.5 mm ground steel pivot 34 in a TEFLON® which is actually the tension in the filament bushing 35, which turns on the pivot 34, the coefficient of friction being of the order of about 0.005. The weight of the wheel is not more than about 100 g.

Calculations and measurements indicate that the friction error in drag measurements with such pulleys due to friction in the two pulleys is of the order of less than about 0.007 g.

The method and system of the invention were tested on a variety of models, and the following illustrates the principle components and data of a typical system:

The tested filament was an optical fiber having an external diameter of 0.25 mm and the dimensions of the section of the wind tunnel used were: length—6 meters, width—3.7 meters, height— 2.6 meters. The wind speed in the tunnel was between 5 m/sec and 20 m/sec.

The arrangement with both pulleys outside the tunnel was used for angles of 35 degrees to 90 degrees between the fiber and tunnel axis, the arrangement with a downstream pulley inside the tunnel was used at angles of 20 degrees to 35 degrees. The weights were of 100 and 110 g respectively, and there was used an analytical mettler balance with an accuracy of ±0.01 g.

For the above mentioned arrangements, the deflection measured was up to about 170 mm and the reading at the balance was up to about 5 gr.

I claim:

1. A method for measuring drag force components acting on a thin filament which comprises tensioning the filament using constant tensioning means at one end of the filament and force measuring means at the other end of the filament, subjecting the filament to an essentially constant flow of air of predetermined velocity, and measuring the axial force acting on the filament and also the deflection of the filament from its initial straight position, and calculating the drag components from such measurements.

2. A method according to claim 1, where the filament is tensioned at a given angle with the axis of a wind tunnel, said filament passing over pulleys, one or both of which are positioned in a wind tunnel, where the filament is tensioned by two weights, attached to its ends, which are of different weight, the heavier of which rests on a balance.

3. A method according to claim 2, where both pulleys are outside the wind tunnel, and the filament is stretched through two holes in the lateral walls of the tunnel so as to tension the filament at a desired angle with the axis of the tunnel.

4. A method according to claim 2, where the deflection of the filament from its initial position is observed via a transparent window in the tunnel wall, by means of a TV-camera.

5. A system for measuring drag forces acting on a tensioned filament, comprising: means for tensioning the filament, means for exposing the tensioned filament to a flow of air at a given velocity acting on it at a predetermined angle; means for measuring the deflection of the center of the filament from its initial position; and means for measuring a force acting tangentially, relative to a longitudinal axis of the filament, on the filament; said system comprising two pulleys of large diameter with a low friction pivot, adapted to stretch and tension the filament passing over the rim of the pulleys, and weights for attachment to the ends of the filament, which are different, and the heavier of which is connected with force measuring means.

6. A system according to claim 5, where one of the two pulleys is located in the wind tunnel, and where said pulley in the wind tunnel includes a fairing operatively connected thereto.

* * * * *